H. MILLER.
ANTISKIDDING DEVICE FOR AUTOMOBILES AND THE LIKE.
APPLICATION FILED SEPT. 14, 1914.
1,132,206.
Patented Mar. 16, 1915.
2 SHEETS—SHEET 1.
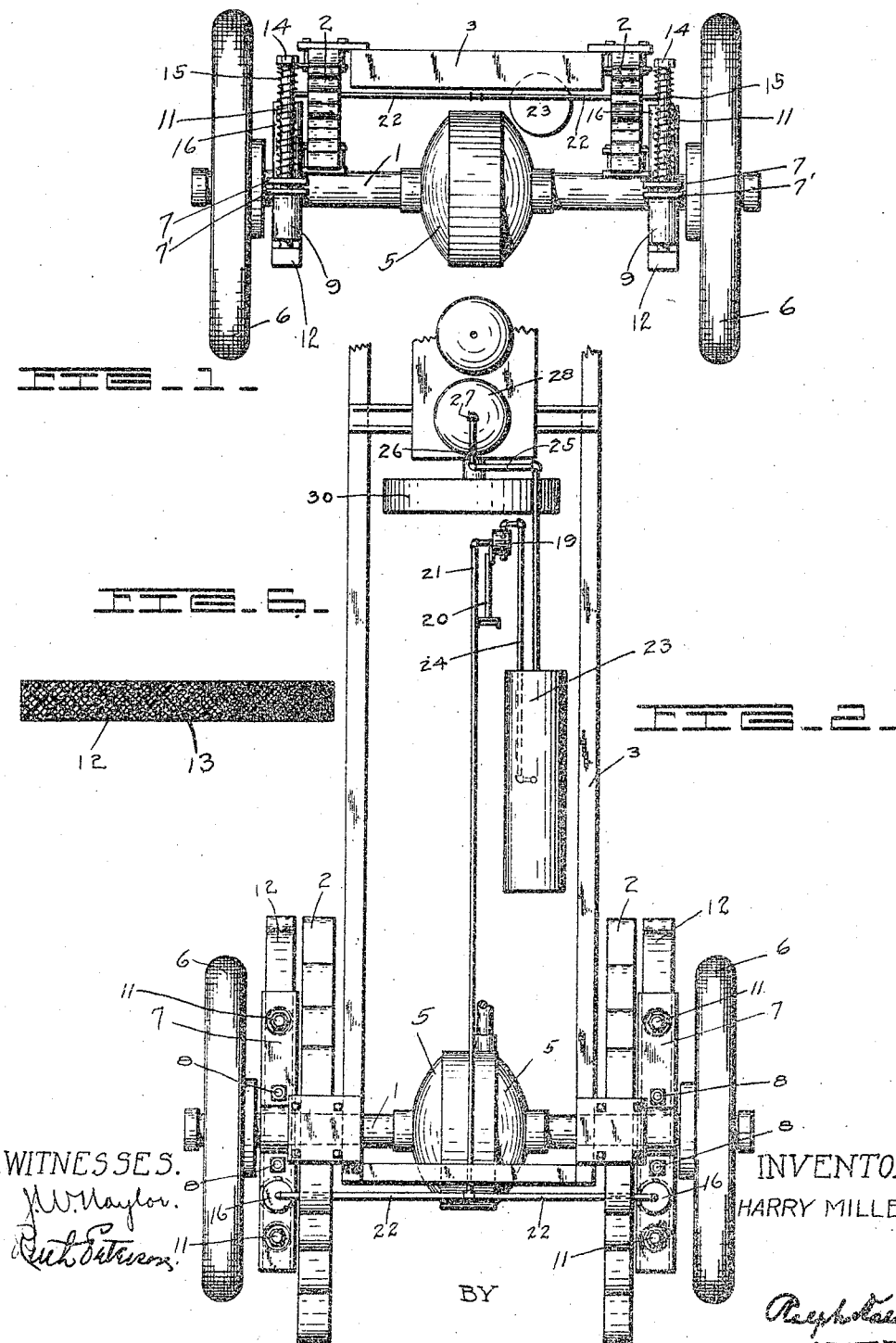
WITNESSES.
INVENTOR
HARRY MILLER
BY
ATTY.

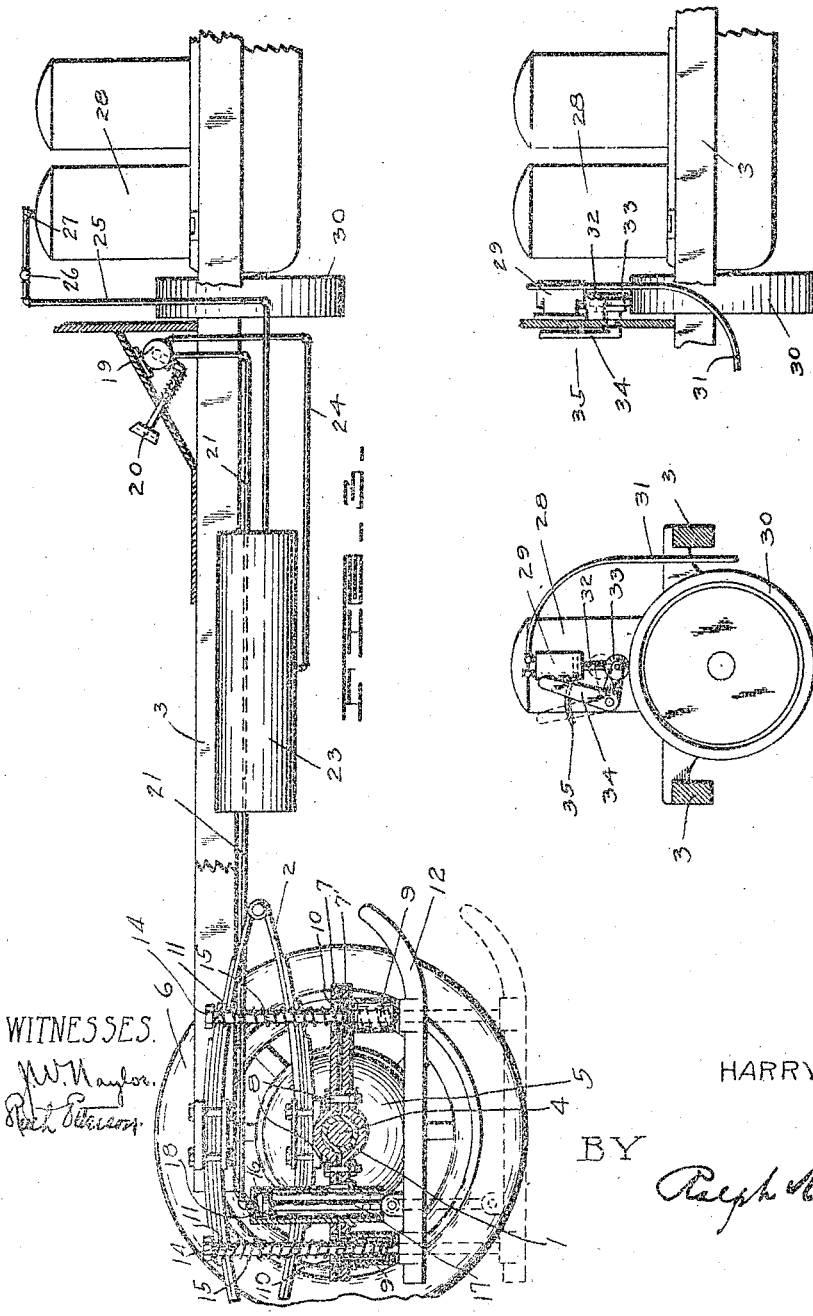

UNITED STATES PATENT OFFICE.

HARRY MILLER, OF ST. LOUIS, MISSOURI, ASSIGNOR OF FIFTY-FIVE ONE-HUNDREDTHS TO CHARLES E. ST. CLAIR AND TEN ONE-HUNDREDTHS TO JOSEPH M. GRAHAM, BOTH OF ST. LOUIS, MISSOURI.

ANTISKIDDING DEVICE FOR AUTOMOBILES AND THE LIKE.

1,132,206.   Specification of Letters Patent.   Patented Mar. 16, 1915.

Application filed September 14, 1914. Serial No. 861,690.

*To all whom it may concern:*

Be it known that I, HARRY MILLER, a citizen of the United States, residing at the city of St. Louis, State of Missouri, have invented a certain new and useful Improvement in Antiskidding Devices for Automobiles and the like, of which the following is a specification, reference being had to the accompanying drawings, forming a part thereof.

This invention relates generally to automobiles and similar vehicles and more particularly, to a certain new and useful improvement in anti-skidding or braking devices for the same, the principal object of my present invention being to provide an efficient and comparatively simple pneumatically operable anti-skidding or braking device for vehicles of the kind stated which may be quickly, easily, and conveniently operated to engage the ground whenever necessary or required to stop the vehicle or prevent skidding.

With the above and other objects in view, my present invention resides in certain novel features of form, construction, arrangement, and combination of parts, all as will hereinafter be described and afterward pointed out in the claims.

In the accompanying drawings, which show the preferred embodiment of my invention, Figure 1 is a rear elevational view of an automobile equipped with my invention; Fig. 2 is a plan view of the same; Fig. 3 is a side elevational view of the same, partly in section; Fig. 4 is a side elevational view of the engine of an automobile, showing a slightly modified form of means for supplying the brake reservoir or tank with compressed air; Fig. 5 is a rear elevational view of the parts shown in Fig. 4; and Fig. 6 is an inverted plan view of one of the ground-engaging members or brake-shoes.

Referring to the said drawings, in which like reference characters refer to like parts throughout the several views, 1 indicates the dead rear axle of an automobile, 2—2 the usual body-supporting springs, 3 the chassis or frame supported on springs 2—2, 4 the live rear axle rotatable within dead axle 1 and adapted to be driven by a differential or the like, not shown, operatively arranged within a housing 5, and wheels 6—6 mounted on, and rotatable with, live axle 4, all said parts being of any ordinary or approved construction. Preferably adjacent the inner face of each of said wheels 6—6, is a pair of upper and lower elongated flat metallic plates 7—7' extending lengthwise of frame 3, each pair of said plates or members 7—7' centrally encircling, and being rigidly fixed by means of bolts or other suitable means 8 in a horizontally disposed position on, axle 1, as seen particularly in Fig. 3. Fixed to, and depending from, each of said lower plates or members 7', is a pair of vertically-disposed spaced-apart cylindrical rod-guiding members 9—9 preferably closed at their lower end and open at their upper end, upper plates or members 7 being transversely perforated, as at 10, in alinement with said members 9—9, also as seen particularly in Fig. 3. Slidably movable lengthwise relatively to, and at their lower end projecting through the closed lower ends of, said rod-guiding members 9—9, are vertically-disposed rods 11—11. Fastened adjacent its opposite ends to the projecting lower ends of each pair of said rods 11—11 is a horizontally-disposed ground-engaging member or brake-shoe 12 preferably checkered or otherwise roughened on its under face, as at 13, so as, when operatively actuated, to positively frictionally engage or grip the ground or other surface upon which the automobile or vehicle may be. Coiled on rods 11—11 and partly housed by members 9—9, are expansion springs 15—15 interposed between the lower end walls of said members 9—9 and suitable heads or the like 14 fixed on the upper ends of said rods 11—11, said springs 15—15 being adapted to yieldingly maintain or hold rods 11—11 and their carried shoes or ground-engaging members 12 in normal or uppermost position with said shoes out of engagement with the ground, as seen in full lines in Fig. 3. Also rigidly fixed on and carried by each pair of said plates or members 7—7', is a vertically-disposed compressed air cylinder 16 provided with a suitable piston-rod 17. Each piston-rod 17 at its upper end is provided within its cylinder 16 with a suitable head 18 and at its lower end has engagement preferably pivotal with a ground-engaging member or shoe 12.

Suitably arranged on the car or vehicle preferably at the front thereof, is a suitable preferably three-way valve 19 provided with a spring-pressed operating-member or stem 20 convenient to the foot of the operator of the car, valve 19, as will be well understood, having an exhaust-port to atmosphere, an entrance-port, and an exit-port. Leading rearwardly from the exit-port of valve 19 is a pipe or compressed-air passage 21 communicating through branch-pipes 22—22 with the upper ends of said compressed-air cylinders 16—16. Leading at one end from a suitable compressed air tank or reservoir 23 carried by the car or vehicle, is a compressed-air supply pipe 24 communicating at its other end with the entrance-port of valve 19. Normally, as when valve operating-member or stem 20 is in the position thereof seen in Fig. 3, communication between pipes 24 and 21 through valve 19 is cut off, the exhaust and exit ports of the valve being in open communication and cylinders 16—16 hence exhausting to atmosphere; on valve-operating-member or stem 20 being depressed, communication between the exhaust and exit ports of the valve 19 is cut off and communication established through valve 19 between said pipes 24 and 21, the compressed air from reservoir or tank 23 flowing therefrom through said pipes into said cylinders 16—16. Consequently, in use or operation, on said valve operating-member or stem 20 being depressed and compressed air from tank or reservoir 23 permitted to flow into said cylinders 16—16, said piston-rods 17—17 will be actuated outwardly and brake-shoes or ground-engaging members 12—12 with their supporting-rods 11—11 will be pneumatically moved downwardly, against the tension of said springs 15—15, to operatively engage the ground, the car, on the engagement of the members 12 with the ground, being either stopped or prevented from skidding. On said members 12 being as described projected into engagement with the ground, the compressed air in the cylinders 16—16 will, as will be evident, cushion the impact of the members 12 upon the ground and thus prevent jarring of the occupants of the car or possible breakage of parts. Furthermore, when the members 12 are in operative or ground-engaging position, it will be seen that, should one or the other or both of the members 12 meet an obstruction, the members 12 may longitudinally tilt at either end and thereby easily ride over the same. It will further be obvious that, depending upon the relative length or throw of pistons 17, the members 12 and their supporting-rods 11—11 may be utilized to jack up the rear end of the car, as, for instance, in the event of necessary repairs to the running gear of the car. On valve operating-member or stem 20 being permitted to return to normal position, communication between pipes 24 and 21 being thereby cut off and communication between pipe 21 and the exhaust-port of said valve 19 being established, cylinders 16—16 will exhaust to the atmosphere, when brake-shoes or members 12 and their supporting-rods 11—11 will, under the tension of said springs 15—15, be moved upwardly or returned to normal position.

While it is to be understood that tank or reservoir 23 may obtain its supply of compressed air from any suitable source, I preferably supply the same with compressed air directly from the engine of the car, and, to that end, I provide a pipe 25, having included therein a rearwardly-opening check-valve 26, communicating at one end with said tank or reservoir 23 and at its other end with a suitable T-pipe or coupling 27 leading to the explosion chamber of the engine 28 of the car. Thus compressed fluid from the engine, opening the valve 26, will flow into said tank or reservoir 23 for further use or consumption in pneumatically operating said pistons 17—17. When tank or reservoir 23 is fully supplied with compressed air and valve 26 is prevented from opening by the pressure of the air in the reservoir or tank 23, the exhaust from the engine will pass to the atmosphere in the usual way. Or, as another or modified means of supplying tank or reservoir 23 with compressed air, I arrange, as shown in Figs. 4 and 5, a suitable air compressing cylinder 29 on the car in operative position relatively to the fly-wheel 30 of the engine 28, this cylinder 29 being of any ordinary or approved construction and being adapted to communicate with tank or reservoir 23 through a suitable pipe or passage 31. Working in cylinder 29 is a piston 32 having a crank engagement at its projecting end with a roller 33 adapted, when in operative position, to engage the periphery of fly-wheel 30. Thus, on the rotation of fly-wheel 30, piston 32 will be reciprocated in its cylinder 29, the air compressed in cylinder 29 flowing through said pipe 31 to the tank or reservoir 23. By means of a suitable bell-crank or other lever 34 working in a sector 35 and having engagement with said piston 32 and its roller 33, roller 33 may be elevated out of operative engagement with said fly-wheel 30 when reservoir or tank 23 is fully supplied with compressed air.

I am aware that minor changes in the form, construction, arrangement, and combination of the several parts of my anti-skidding or braking device may be made and substituted for those herein shown and described without departing from the nature and principle of my invention.

Having thus described my invention, what I claim and desire to secure by Letters Patent is:

1. The combination with an automobile or the like, including its rear axle, of an elongated support fixed on said axle and horizontally disposed relatively to the frame of the automobile, rod-guiding members fixed on said support and disposed on opposite sides of said axle, headed-rods projecting through said members and slidably movable relatively thereto, a ground-engaging member fastened to said rods, coiled springs on said rods interposed between the heads thereof and said rod-guiding members, said springs being adapted to yieldingly maintain said rods and their carried ground-engaging member in normal inoperative position with said ground-engaging member out of engagement with the ground, and means for pneumatically actuating said ground-engaging member to engage the ground; substantially as described.

2. The combination with an automobile or the like, including its rear axle, of an elongated support fixed on said axle and horizontally disposed relatively to the frame of the automobile, rod-guiding members fixed on said support and disposed on opposite sides of said axle, headed-rods projecting through said members and slidably movable relatively thereto, a ground-engaging member fastened to said rods, coiled springs on said rods for yieldingly maintaining said rods and their carried ground-engaging member in normal inoperative position with said ground-engaging member out of engagement with the ground, a compressed-air cylinder fixed on said support intermediate said rods, a piston-rod working in said cylinder, said piston-rod having engagement at one end with said ground-engaging member, and means for supplying compressed air to said cylinder to actuate said piston-rod to project said ground-engaging member into engagement with the ground; substantially as described.

In testimony whereof, I have signed my name to this specification, in the presence of two subscribing witnesses.

HARRY MILLER.

Witnesses:
CHAS. ST. CLAIR,
JOSEPH M. GRAHAM.